UNITED STATES PATENT OFFICE.

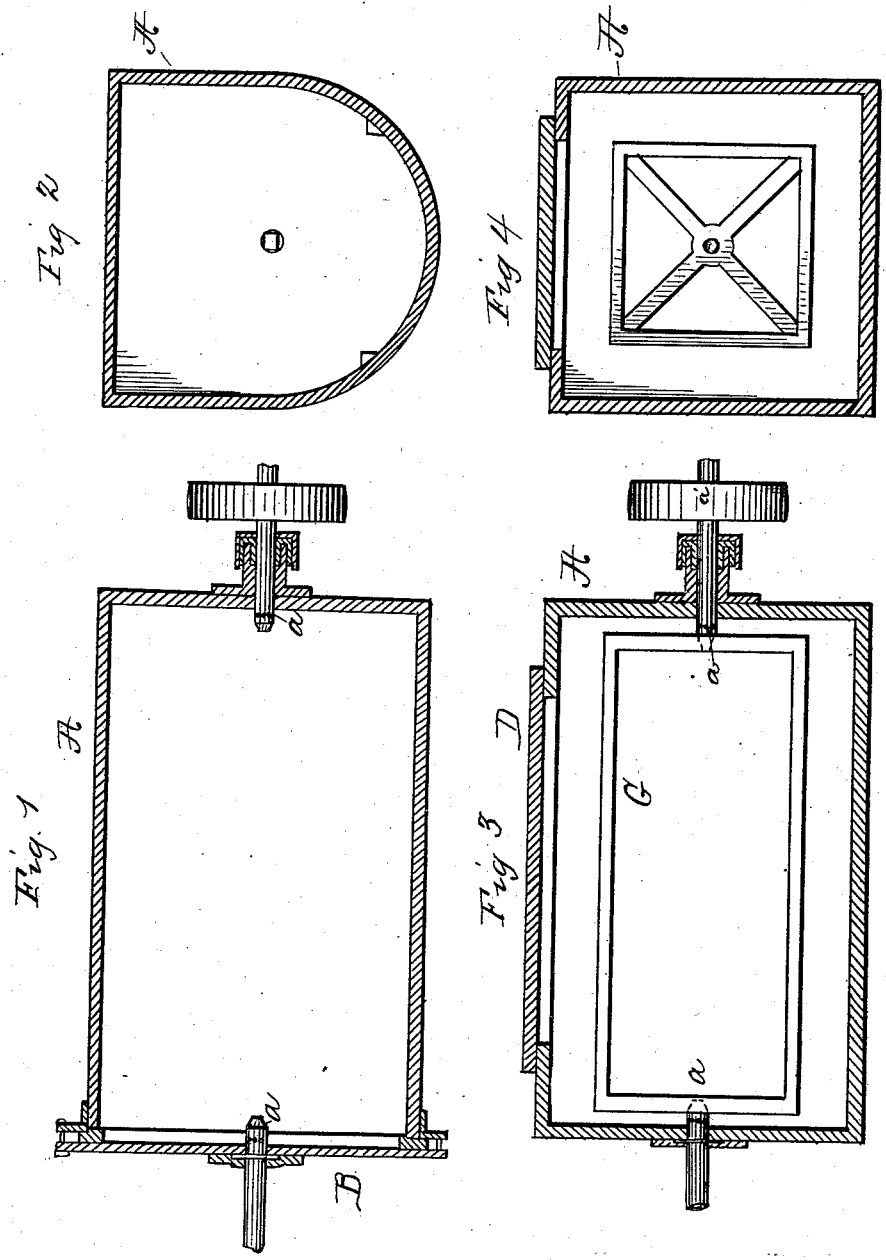

LENOX SIMPSON, OF PITTSBURG, PENNSYLVANIA.

APPARATUS FOR TANNING.

SPECIFICATION forming part of Letters Patent No. 314,200, dated March 17, 1885.

Application filed September 20, 1884. (No model.)

*To all whom it may concern:*

Be it known that I, LENOX SIMPSON, a citizen of the United States, residing at Pittsburg, in the county of Allegheny and State of Pennsylvania, have invented certain new and useful Improvements in Apparatus for Tanning, of which the following is a full, clear, and exact description.

My invention relates to that class of tanning apparatus in which the hides are alternately subjected to the action of tannic acid and lifted therefrom while held in a vat from which the air has been exhausted; and the invention consists in providing a cheap, simple, and durable air and liquid vat which is to be provided with a revolving removable hide-frame and ingress and egress for the tannic fluid.

In the drawings, Figure 1 represents a longitudinal vertical section, and Fig. 2 a transverse section, of my improvement; and Figs. 3 and 4, modifications of same.

A represents a tanning-vat having in Fig. 1 a semi-cylindrical bottom and in Fig. 3 a flat bottom. In these vats the tannic liquor is seldom allowed to rise above the middle of the vat, and as it is best to economize in the amount of liquor used in the vat at any one time I prefer to use that form shown in Figs. 1 and 2, having a semi-cylindrical bottom. These vats may, however, be of various angular or irregular configurations.

The vats may be either provided with a removable head, B, and hide-frame G, as shown in Figs. 1 and 2, or may have a fixed hide-frame and removable top D, as shown in Figs. 3 and 4.

To allow for the influx and efflux of the tannic liquor, I prefer to make the trunnions $a$, upon which the hide-frame is supported in the vat, hollow, and connect said trunnions with the liquor supply and discharge pipes; but this construction is not absolutely essential, as the liquor may be conducted in and from the vat by means of openings situated away from the trunnions.

The trunnion $a$, which carries the drive-wheel $a'$, is not conical at the point, like the opposite one, but of any irregular shape, so that it may fit a correspondingly-shaped hole in the hide-frame and rotate it around the fixed journal. The rotating journal $a$ is also movable longitudinally, so as to allow the hide-frame to be first centered on the fixed journal and then receive the journal which is to give it rotation.

Having thus described my invention, what I claim is—

In a tanning apparatus, a fixed tanning-vat and an independently-rotary hide-frame, in combination with journals $a\ a$, arranged centrally in the ends of the vat, one of said journals being rotated by a drive-wheel, $a'$, the other being fixed or non-revoluble, substantially as shown and described.

LENOX SIMPSON.

Witnesses:
 J. A. KURTZ,
 W. D. THOMAS.